(12) United States Patent
Gorman et al.

(10) Patent No.: US 9,129,392 B2
(45) Date of Patent: Sep. 8, 2015

(54) AUTOMATIC QUANTIFICATION OF MITRAL VALVE DYNAMICS WITH REAL-TIME 3D ULTRASOUND

(75) Inventors: Robert C. Gorman, Lower Gwynedd, PA (US); Alison Pouch, Philadelphia, PA (US); Joseph H. Gorman, III, Lower Gwynedd, PA (US); Chandra Sehgal, Wayne, PA (US); Paul A. Yushkevich, Wynnewood, PA (US); Benjamin Jackson, Wynnewood, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 216 days.

(21) Appl. No.: 13/580,833

(22) PCT Filed: Feb. 25, 2011

(86) PCT No.: PCT/US2011/026208
§ 371 (c)(1),
(2), (4) Date: Feb. 27, 2013

(87) PCT Pub. No.: WO2011/106622
PCT Pub. Date: Sep. 1, 2011

(65) Prior Publication Data
US 2013/0195335 A1    Aug. 1, 2013

Related U.S. Application Data

(60) Provisional application No. 61/308,127, filed on Feb. 25, 2010.

(51) Int. Cl.
*G06K 9/00* (2006.01)
*G06T 7/00* (2006.01)

(52) U.S. Cl.
CPC ............. *G06T 7/0097* (2013.01); *G06T 7/0012* (2013.01); *G06T 7/0083* (2013.01); *G06T 2207/10076* (2013.01); *G06T 2207/20128* (2013.01); *G06T 2207/30048* (2013.01)

(58) Field of Classification Search
None
See application file for complete search history.

(56) References Cited

U.S. PATENT DOCUMENTS 7,155,042 B1    12/2006    Cowan et al.
7,280,710 B1    10/2007    Castro-Pareja et al.
(Continued)

FOREIGN PATENT DOCUMENTS

WO    WO 2009/129369 A1    10/2009

OTHER PUBLICATIONS

Accola et al., "Midterm outcomes using the physio ring in mitrel valve reconstruction: experience in 492 patients," Ann. Thorac. Surg., Apr. 2005, 79(4), 1276-1283.
(Continued)

*Primary Examiner* — Hadi Akhavannik
(74) *Attorney, Agent, or Firm* — Baker & Hostetler LLP

(57) ABSTRACT

A series of rt-3DE images of the mitral valve are quantitatively analyzed so as to enable, for example, prediction of the degree of recurrent ischemic mitral regurgitation (IMR) and comprehensive assessments of leaflet tethering and "tenting" for the entire mitral valve. In accordance with the method, first, the rt-3DE images are registered with symmetric diffeomorphism to obtain information about how the mitral valve deforms over time. Second, the mitral valve is segmented with the level sets or other known segmentation method at each time point in the cardiac cycle with minimal user interaction. Third, the information about mitral valve structure is reduced into a 3D medial model, a compact representation of shape. In other words, a volumetric segmentation of the mitral valve is condensed to a form that is amenable to clinically relevant morphometry.

18 Claims, 4 Drawing Sheets

(56) References Cited

U.S. PATENT DOCUMENTS

| | | | |
|---|---|---|---|
| 8,009,887 B2* | 8/2011 | Ionasec et al. | 382/128 |
| 8,218,845 B2* | 7/2012 | Lynch et al. | 382/131 |
| 8,538,109 B2* | 9/2013 | Vitanovski et al. | 382/131 |
| 2002/0072672 A1 | 6/2002 | Roundhill et al. | |
| 2003/0031357 A1 | 2/2003 | Wenzel et al. | |
| 2005/0254708 A1 | 11/2005 | Jolly et al. | |
| 2007/0223794 A1 | 9/2007 | Preiss et al. | |
| 2008/0069436 A1 | 3/2008 | Orderud | |
| 2008/0085043 A1 | 4/2008 | Watanabe et al. | |
| 2008/0307304 A1* | 12/2008 | Feiler et al. | 715/700 |
| 2009/0197922 A1* | 8/2009 | Maitland et al. | 514/350 |

OTHER PUBLICATIONS

Arts et al., "Stresses in the closed mitrel valve: a model study," J. Biomech., 1983, 16(7), 539-547.

Avants et al., "Symmetric Diffeomorphic Image Registration: Evaluating Automated Labeling of Elderly and Neurodegenerative Cortex and Frontal Lobe," Biomedial Image Registration, Lecture Notes in Computer Science, 2006, vol. 4057, 50-57.

Barber et al., "Myxomatous mitrel valve chordae. I: mechanical properties," J. Heart Valve Dis., May 2001, 10(3), 320-324 [Abstract Only].

Braunberger et al., "Very long-term results (more than 20 years) of valve repair with Carpentier's techniques in nonrheumatic mitrel valve insufficiency," Circulation, Sep. 2001, 104(12 Suppl. 1), I-8-I-11.

Carabello, B. A., "Indications for mitral valve surgery," J. Cardiovasc. Surg., Oct. 2004, 45(5), 407-418.

Chauvaud et al., "Long-term (29 years) results of reconstructive surgery in rheumatic mitral valve insufficiency," Circulation, Sep. 2001, 104(12 Suppl. 1), I-12-I-15.

Chiechi et al., "Functional anatomy of the normal mitral valve," J. Thorac. Surg., Sep. 1956, 32(3), 378-398.

Cohn et al., "The long-term results of mitral valve reconstruction for the "floppy" valve," J. Card. Surg., Mar. 1994, 9(2 Suppl.), 278-281.

David et al., "Late results of mitral valve repair for mitral regurgitation due to degenerative disease," Ann. Thorac. Surg., Jul. 1993, 56(1), 7-12, Discussion 13-14.

Filsoufi et al., "Current management of ischemic mitral regurgitation," Mt. Sinai. J. Med., Mar. 2005, 72(2), 105-115.

Flameng et al., "Is recurrence of mitrel valve regurgitation more frequent in Barlow disease than in fibroelastic deficiency post repair?," American Association for Thoracic Surgery Program Book, 2007, 153 (Abstract).

Flameng et al., "Recurrence of mitral valve regurgitation after mitral valve repair in degenerative valve disease," Circulation, Apr. 2003, 107(12), 1609-1613.

Fornes et al., "Correlation between clinical and histologic patterns of degenerative mitral valve insufficiency: a histomorphometric study of 130 excised segments," Cardiovasc. Pathol., Mar.-Apr. 1999, 8(2), 81-92.

Gillinov et al., "Cosgrove-Edwards Annuloplasty System: midterm results," Ann. Thorac. Surg., Mar. 2000, 69(3), 717-721.

Gorman III et al., "Distortions of the mitrel valve in acute mitral regurgitation," Ann. Thorac. Surg., Oct. 1997, 64(4), 1026-1031.

International Patent Application No. PCT/US2011/026208: International Search Report and Written Opinion dated Apr. 19, 2011, 6 pages.

Kim et al., "Cardiopulmonary exercise testing before and one year after mitral valve repair for severe mitral regurgitation," Am. J. Cardiol., May 2004, 93(9), 1187-1189.

Kunzelman et al., "Altered collagen concentration in mitrel valve leaflets: biochemical and finite element analysis," Ann. Thorac. Surg., Dec. 1998, 66(1), S198-S205 [Abstract only].

Kunzelman et al., "Annular dilatation increases stress in the mitrel valve and delays coaptation: a finite element computer model," J. Cardiovasc. Surg., Aug. 1997, 5(4), 427-434.

Kunzelman et al., "Finite element analysis of the mitral valve," J. Heart Valve Dis., May 1993, 2(3), 326-340 [Abstract only].

Levine et al., "Three-dimensional echocardiographic reconstruction of the mitrel valve, with implications for the diagnosis of mitrel valve prolapse," Circulation, Sep. 1989, 180(3), 589-598.

Ling et al., "Early surgery in patients with mitrel regurgitation due to flail leaflets: a long-term outcome study," Circulation, Sep. 1997, 96(6), 1819-1825.

Luxereau et al., "Aetiology of surgically treated mitral regurgitation," Eur. Heart J., Jul. 1991, 12(Suppl. B), 2-4.

McGee et al., "Recurrent mitrel regurgitation after annuloplasty for functional ischemic mitral regurgitation," J. Thorac. Cardiovasc. Surg., Dec. 2004, 128(6), 916-924.

Olson et al., "Surgical pathology of the mitrel valve: a study of 712 cases spanning 21 years," Mayo Clin. Proc., Jan. 1987, 62(1), 22-34.

Rodriguez et al., "Effect of cutting second-order chordae on in-vivo anterior mitral leaflet compound curvature," J. Heart Valve Dis., Sep. 2005, 14(5), 592-602.

Sacks et al., "In vivo three-dimensional surface geometry of abdominal aortic aneurysms," Ann. Biomed. Eng., Jul.-Aug. 1999, 27(4), 469-479.

Sakamoto et al., "Effects of hemodynamic alterations on anterior mitrel leaflet curvature during systole," J. Thorac. Cardiovasc. Surg., Dec. 2006, 132(6), 1414-1419.

Salgo et al., "Effect of annular shape on leaflet curvature in reducing mitrel leaflet stress," Circulation, Jul. 2002, 106, 711-717.

The Geometry Center Home Page, "Qhull," http://www.qhull.org/, created May 17, 1995, 3 pages.

Tibayan et al., "Increases in mitrel leaflet radii of curvature with chronic ischemic mitrel regurgitation," J. Heart Valve Dis., Sep. 2004, 13(5), 772-778.

Timek et al., "Aorto-mitral annular dynamics," Ann. Thorac. Surg., Dec. 2003, 76(6), 1944-1950.

Watanabe et al., "Quantitation of mitrel valve tenting in ischemic mitrel regurgitation by transthoracic real-time three-dimensional echocardiography," J. Am. Coll. Cardiol., Mar. 2005, 45(5), 763-769.

Yushkevich et al., "Continuous Medial Representation for Anatomical Structures," IEEE Transactions on Medical Imaging, Dec. 2006, 25(12), 1547-1564.

* cited by examiner

AUTOMATIC QUANTIFICATION OF MITRAL VALVE DYNAMICS WITH REAL-TIME 3D ULTRASOUND

CROSS-REFERENCE TO RELATED APPLICATIONS

This application is the National Stage of International Application No. PCT/US2011/026208, filed Feb. 25, 2011, which claims the benefit of U.S. Provisional Application No. 61/308,127 filed Feb. 25, 2010, the disclosures of which are incorporated herein by reference in their entireties.

GOVERNMENT SUPPORT

The present invention was supported by the National Institutes of Health under Grant Numbers NIH R0-1 HL-073021 (J. H. Gorman) and NIH R0-1 HL-063954 (R. C. Gorman), and NIH R0-1 HL-076560 (J. H. Gorman) and by the American Heart Association Established Investigator Award 0840121 N (J. H. Gorman). The government may have certain rights in the invention.

FIELD OF THE INVENTION

The present invention relates to methods and computer processing devices for quantifying mitral valve dynamics using real-time 3D ultrasound, thus enabling, for example, prediction of the degree of recurrent ischemic mitral regurgitation (IMR) and comprehensive assessments of leaflet tethering and "tenting" for the entire mitral valve.

BACKGROUND OF THE INVENTION

Mitral valve repair has become the treatment of choice for patients with mitral regurgitation (MR) due to myxomatous leaflet degeneration and post-infarction ventricular remodeling (ischemic mitral regurgitation (IMR). In this condition, the mitral leaflets are structurally normal but valve geometry is grossly disturbed due to a variable combination of leaflet tethering and annular dilation. However, recent long-term studies have indicated that the recurrence rate of significant MR after repair is much higher than previously thought, particularly in patients with IMR. Precise three-dimensional (3D) modeling of the mitral valve has the potential to improve the understanding of valvular mechanics and to allow for an optimized patient—specific approach to mitral valve surgery. Recent technological advancement in real-time three-dimensional echocardiography (rt-3DE) overcomes the limitations of two-dimensional echocardiography by facilitating through-plane motion analysis and three-dimensional reconstruction of valve geometry. Current commercial rt-3DE software packages provide visual representations of the mitral valve but enable only simple mitral valve quantification, such as manual segmentation and user-guided measurement of the valve dimensions. It is desired to apply automated image processing methods to rt-3DE image data to provide a means of quantitatively assessing mitral valve geometry and function. Such practical, quantitative tools would have the potential to assist in clinical decision-making, to guide therapeutic intervention, to examine the outcome of prevention and treatment strategies, and to develop research models and tools for study of the function of the mitral valve.

IMR is a common clinical phenomenon that results from complex 3D changes in valve anatomy. IMR increases mortality even when mild, with a strong graded relationship between severity and reduced survival. The current surgical treatment for IMR is undersized ring annuloplasty. Results of this approach are suboptimal. Automated rt-3DE analysis has the potential to enhance the understanding of the mechanism of IMR and to improve the therapeutic result. Preclinical and clinical studies have demonstrated that IMR results from two distinct anatomic disturbances: 1) subvalvular remodeling that promotes leaflet tethering, and 2) annular dilation that produces central malcoaptation in the annular plane. Although annuloplasty effectively treats annular dilation, it does not improve and may even exacerbate leaflet tethering. Moreover, it has been demonstrated that commonly used annuloplasty devices significantly reduce leaflet curvature, thereby increasing valvular stress and further compromising repair durability. Leaflet augmentation techniques have the potential to improve repair results by alleviating leaflet tethering and flattening. However, using automated rt-3DE analysis of the mitral valve, it is believed that combining posterior leaflet augmentation with ring annuloplasty in an ovine model of IMR will decrease leaflet tethering and improve the efficacy of repair compared to undersized annuloplasty alone.

A number of imaging modalities have been utilized for qualitative and quantitative analysis of mitral valve function. These include 2D and 3D echocardiography (2DE and 3DE), magnetic resonance imaging (MRI), multidetector computed tomography (MDCT), sonomicrometry, and biplane radiation with tantalum markers. Traditionally, assessment of the mitral valve has been achieved by 2D ultrasound image analysis, which derives structural and dynamic information from one cross-sectional view of the valve. With the advent of 3D ultrasound, the possibility of obtaining a full 3D assessment of cardiac structures was introduced. This early 3D technology, however, was considerably limited by poor spatial and temporal resolution. With recent advances in transducer design and super-computed signal processing, high-resolution 3D ultrasound images of the heart can now be acquired at 20-30 frames per second. This capability, combined with the advancement of transesophageal probes, opens a previously unexplored avenue for the study of mitral valve architecture and mechanics. Although current software packages allow for manual segmentation and user-guided measurement of valve dimensions in rt-3DE datasets, the quantification is time-consuming and labor-intensive. To address this issue, it is desirable to develop a tool for comprehensive, semi-automated analysis of the mitral valve using the latest rt-3DE technology. The invention addresses these needs in the art.

SUMMARY OF THE INVENTION

Given a series of rt-3DE images of the mitral valve, the methods and systems described herein are used to quantitatively analyze the resulting images. The methods include three primary steps. First, the rt-3DE images are registered with symmetric diffeomorphism to obtain information about how the mitral valve deforms over time. Second, the mitral valve is segmented with the level sets or comparable segmentation method at each time point in the cardiac cycle with minimal user interaction. Third, the information about mitral valve structure is reduced into a 3D medial model, a compact representation of shape. In other words, a volumetric segmentation of the valve is condensed to a form that is amenable to clinically relevant morphometry.

In an exemplary embodiment, a processor-implemented method is provided for quantifying dynamic movement of a mitral valve using 3 dimensional images of the mitral valve. For example, rt-3DE images may be used. The method includes the steps of:

a processor obtaining a series of N 3-dimensional images of the mitral valve over time;

the processor registering each pair of consecutive 3-dimensional images using symmetric diffeomorphism to obtain information about how the mitral valve deforms over time;

segmenting the mitral valve in the N 3-dimensional images using landmark points on the mitral valve in the N 3-dimensional images at predetermined time points in the cardiac cycle;

the processor using the information about how the mitral valve deforms over time (described by a 4D shape prior) to fit a 3 dimensional medial model to the segmented mitral valve at each of the predetermined time points in the cardiac cycle; and outputting the medial representations of the mitral valve as a quantification of the dynamic movement of the mitral valve over time.

In further exemplary embodiments, the method is characterized in that segmenting the mitral valve includes user-initialization of landmark points on the mitral valve in the N 3-dimensional images to extract a pertinent region of interest (ROI) and then segmenting the mitral valve in this ROI using a level sets or comparable segmentation method. Segmenting the mitral valve may also include warping the initialized points on the mitral leaflets using deformation fields obtained from the image registration to obtain the initialization image for segmentation at any of the predetermined time points in the cardiac cycle and then segmenting the initialized image using the level sets or comparable segmentation method.

In still further exemplary embodiments, the method may include the processor building a 3D medial template for initialization and the processor creating a 4D shape prior of the mitral valve to guide 3D medial template fitting to either mitral valve segmentations created in the segmenting step or directly to the 3 dimensional images so as to produce a medial representation of the mitral valve at each predetermined time point in the cardiac cycle. The clinically relevant parameters may include tenting volume of mitral leaflets of the mitral valve, tenting index of the mitral leaflets of the mitral valve at mid-systole, regurgitant orifice area of the mitral valve, annular area of the mitral valve, and/or annular and leaflet displacement and velocity over time. The method may also include the processor creating a moving video image depicting the mitral valve throughout the cardiac cycle from the medial representations of the mitral valve and outputting the moving video image and a set of clinically relevant parameters derived from the medial representation of the mitral valve at each the predetermined time point in the cardiac cycle in the outputting step.

The invention also includes a computer system having a processor programmed by computer readable instructions to implement means for performing the steps of the method described herein.

BRIEF DESCRIPTION OF THE DRAWINGS

The above and other features and advantages of the invention will be apparent from the following detailed description of the figures, of which:

FIG. 3(A) illustrates an annular segmentation technique, while FIG. 3(B) illustrates the leaflet segmentation technique where the intercommissural axis, which bisects the anterior commissure (AC) and posterior commissure (PC), is shown along with each of the septolateral long-axis measurement planes.

DETAILED DESCRIPTION OF THE EXEMPLARY EMBODIMENTS

Figure 1:
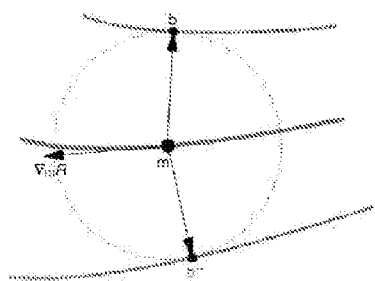
FIG. 1 illustrates a two-dimensional diagram of the medial geometry of a mitral valve where the curve through m represents the medial surface (skeleton) m, the circle has radius R, given by the radial scalar field on m, and the boundary, shown by the other curves, consists of two parts, $b^+$ and $b^-$, derived from the skeleton and radial scalar field by inverse skeletonization.

Certain specific details are set forth in the following description with respect to FIGS. 1-8 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

The methods and systems of the invention will be described below in connection with three image processing strategies applied in accordance with the invention. Data will be provided comparing manual and semi-automated valve segmentation techniques, and the image processing pipeline used for automated quantitative valve assessment in accordance with the invention will be described.

It will be appreciated by those skilled in the art that the embodiments described herein are preferably implemented in software that is executed by a processor that is in operative communication with a memory component that stores the software for execution. The processor may include a standardized processor, a specialized processor, a microprocessor, or the like. The processor may execute instructions including, for example, instructions that are executed by the processor to provide "means" for implementing the functions described in more detail below. The memory component may include a tangible computer readable storage medium in the form of volatile and/or nonvolatile memory such as random access memory (RAM), read only memory (ROM, cache, flash memory, a hard disk, or any other suitable storage component. In one embodiment, the memory component may be a separate component in communication with the processor.

According to another embodiment, the memory component may be integrated into the processor and the processor may be part of a special purpose chip or chip set. Those skilled in the art will also appreciate that the instructions for implementing the method described herein may be stored on such a memory device to create a computer readable storage medium for implementing the method of the invention. All such processing environments are contemplated by the following description.

Image Processing Strategies

A. Image Registration with Symmetric Diffeomorphism

The goal of image registration is to estimate the displacement between an image volume $V_t$ acquired at time t and an image $V_{t+1}$ acquired at time t+1. In the methods described herein, an extension of the Lagrangian diffeomorphic registration technique developed by Avants et al. in "Symmetric Diffeomorphic Image Registration: Evaluating Automated Labeling of Elderly and Neurodegenerative Cortex and Frontal Lobe," Biomedial Image Registration: Springer Berlin/Heidelberg; 2006. p. 50-7, is used to register rt-3DE images of the mitral valve. Briefly, a diffeomorphism is a differentiable map with a differentiable inverse. Shortest paths between elements in this space are termed geodesic. In general, a diffeomorphism is produced by integrating a time-dependent velocity field. Avants' formulation has symmetry properties required for a geodesic connecting two images, $V_t$ and $V_{t+1}$, in the space of diffeomorphic transformations. It guarantees that the path from $V_t$ to $V_{t+1}$ is the same as that computed from $V_{t+1}$ to $V_t$, regardless of the similarity metric or optimization parameters. Driving forces may derive from a number of probabilistic measures of appearance relationships, which permits the flexibility to incorporate knowledge of ultrasound speckle characteristics. Importantly, the method is efficient on single-processor machines for large datasets.

B. Mitral Valve Segmentation Using Level Sets

The goal of segmentation is to delineate an object, such as the mitral valve, in an image. Segmentation by the level sets approach described by Sethian in "Level set methods and fast marching methods: Evolving interfaces in computational geometry, fluid mechanics, computer vision and material science," Cambridge: Cambridge University Press; 1999, is formulated as follows. Suppose that $\lceil$ is the surface of a spherical seed that the user identifies within a mitral leaflet in an rt-3DE image volume. It is desired that the initialized surface evolve and align with the leaflet boundary, represented by the sharp intensity gradient between the hypoechoic ventricular or atrial chamber and the hyperechoic leaflet. In the level sets formulation, $\lceil(t)$ is a propagating interface, or front, that is embedded in a higher-dimensional function $\phi(x,t)$. Here, x is the path of a point on the propagating front and $\phi$ is the level set function. At any time t, the level set function represents the front $\lceil(t)$ as $\phi(x(t),t)=0$. The front evolves according to:

$$\frac{\partial \lceil(t)}{\partial t} = F \cdot n,$$

where F is the speed vector of the front and n is normal to the front. Given $\phi(x(0),0)$, it can be shown that the level set function evolves as:

$$\frac{\partial \varphi}{\partial t} + F|\nabla \varphi| = 0.$$

The formulation of the speed function, which is composed of ballooning, curvature, and advection terms, depends on the specific application. Solutions for the level set function are computed using finite difference approximations for derivatives, and a narrow-band implementation of the level sets method can be employed to decrease computation time. As explained further below, the level sets or other comparable segmentation method can be effectively used to obtain a binary segmentation of the mitral valve from rt-3DE datasets.

C. Medial Representation

In order to represent the 3D geometry of the mitral valve in a compact manner suitable for statistical shape analysis, 3D medial modeling is incorporated into the automated processing approach. A medial model represents the shape of a structure by explicitly defining its skeleton and deriving the boundary geometry from the medial axis. Here, the term skeleton refers to the Blum skeleton, where the Blum skeleton of a geometric object in $R^3$ is a surface or set of surfaces produced by thinning the object uniformly, or evolving the boundary at uniform speed along the inward normal, until the object becomes infinitely thin. As described by Yushkevich et al in "Continuous Medial Representation for Anatomical Structures," IEEE Transactions on Medical Imaging 25(12): 1547-1564, 2006, the 3D medial modeling approach utilizes the idea of inverse skeletonization, whereby the object is defined first by its medial axis and the object boundary is constructed analytically from its skeleton. The skeleton is described as a combination of medial manifolds m in $R^3$ and a positive-valued radial thickness field R in $R^+$ where m and R can be a user-specified mesh, surface, or function. The equations used to derive the object's boundary $b^\pm$ from the medial manifold represented by m are the following:

$$b^\pm = m + RU^\pm$$

$$U^\pm = -\nabla_m R \pm \sqrt{1 - \|\nabla_m R\|^2} N_m,$$

where $N_m$ is the unit normal vector to the manifold at point m, and $\nabla_m$ is the Riemannian gradient of R on the manifold m. FIG. 1 illustrates a two-dimensional diagram of the medial geometry. The curve through m represents the medial surface (skeleton) m. The circle has radius R, given by the radial scalar field on m. The boundary, shown by the other curves, consists of two parts, $b^+$ and $b^-$, derived from the skeleton and radial scalar field by inverse skeletonization. The vector $\nabla_m R$ lies in the tangent plane of m and points in the direction of greatest change in R. These models represent shape compactly and provide local and global shape features, like surface curvature. Additionally, this representation establishes points of correspondence between different instances of an object, which facilitates statistical shape comparison.

The medial model for a particular object, in this case a mitral valve, is defined by fitting a deformable medial template to a binary segmentation of the object. Thus, a deformable template must be generated prior to fitting the model to a new instance of the object. The medial model described by {m, R} represents shape compactly and provides local and global shape features, like surface curvature. Additionally, this representation establishes points of correspondence between different instances of an object, which facilitates statistical shape comparison. The incorporation of 3D medial modeling in the image analysis strategy described below has the following application-specific advantages in that it enables automated detection of the annulus, it corrects for errors in segmentation, particularly in noisy ultrasound data; and it enables reliable measurement of leaflet curvature—not the jagged curvature of the actual leaflet surface, but the curvature of a manifold fitted through the center of the leaflet.

Figure 2:
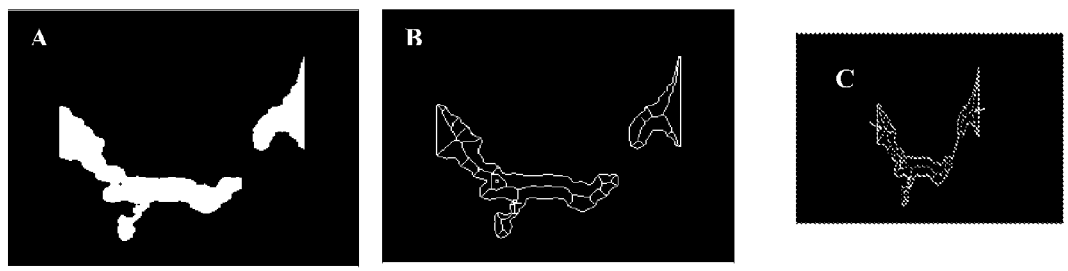
FIG. 2 illustrates an approximate medial axis of the mitral valve in two dimensions.
Figure 3:
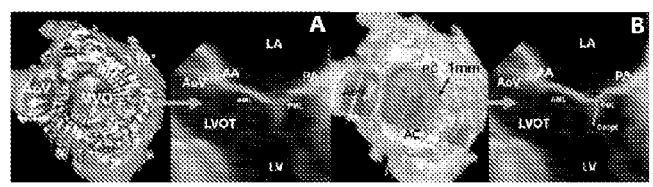

FIG. 2 illustrates an approximate medial axis of the mitral valve in two dimensions. FIG. 2(A) shows a cross-sectional slice of a binary segmentation of the mitral valve at mid-systole. The image data used for this segmentation was acquired from a patient with ischemic mitral regurgitation, as evidenced by malcoaptation of the leaflets. In FIG. 2(B), a skeletonization of the binary valve segmentation is depicted. With appropriate pruning, an approximate medial axis can be extracted from this skeleton, shown in dark lines in FIG. 2(C). FIG. 2(C) illustrates an approximate two-dimensional medial axis. The arrows indicate to annular points automatically detected by skeletal pruning. The line spans the regurgitant orifice of the valve. The pruning provides automatic identification of two points on the mitral annulus, indicated by the arrows, and the size of the regurgitant orifice spanned by the line can be automatically detected and measured. While FIG. 2 is shown for illustrative purposes, it is important to note that deformable medial modeling is distinctly different than skeletonization, where the skeleton of an object is deterministically derived from its boundary representation. Such skeletonization has limited utility in morphometric analysis because the number and configuration of the branches in the skeleton are highly sensitive to boundary noise. In contrast, deformable modeling ensures that the topology of the skeletal representation remains the same for all subjects in a study.

Comparison Data

A manual image analysis strategy for mitral valve morphometry in rt-3DE datasets is used to collect a first set of data. Mitral valve tenting index, a measure of subvalvular remodeling, is one example of a clinically relevant parameter that can be extracted with this image analysis strategy. Derived from a 3DE dataset, the measurement of tenting index is not influenced by viewing plane selection and is independent of mitral annular dilation. Preclinical studies indicate that this index can be used to quantify the extent of leaflet tethering and act as a surrogate measure for the degree of subvalvular remodeling in the setting of IMR. This manual image analysis strategy developed to segment the mitral valve in an rt-3DE image volume will be described and then an alternative semi-automated segmentation strategy will be described that more rapidly produces a higher-resolution rendering of the mitral valve from the same dataset. This efficient, semi-automated approach is a significant component of the image processing pipeline outlined further below. Finally, the computation of mitral valve tenting index, one example of how these segmentations can be used for clinically relevant morphometry, will be illustrated.

Mitral Valve Segmentation Strategies

The following two valve segmentation techniques were applied to a transesophageal rt-3DE dataset acquired with the Philips iE33 platform. This dataset was obtained from an adult male with congestive heart failure and IMR prior to mitral valve repair with annuloplasty. A single 3DE image volume depicting the mitral valve at mid-systole was selected for analysis.

Manual Segmentation

FIG. 3(A) illustrates an annular segmentation technique. A rotational template consisting of 18 long axis planes evenly spaced at 10° increments and centered at the valve orifice is constructed. The mitral valve orifice (MVO), left ventricle (LV), anterior (AML) and posterior (PML) mitral valve leaflets, left atrium (LA), left ventricular outflow track (LVOT) and aortic valve (AoV) are labeled. Anterior (AA) and posterior (PA) annular points are marked. FIG. 3(B), on the other hand, illustrates the leaflet segmentation technique where the intercommissural axis, which bisects the anterior commissure (AC) and posterior commissure (PC) is shown along with each of the septolateral long-axis measurement planes. Each measurement plane is separated by a 1 mm interval along the intercommissural axis. Freehand curves tracing the valve leaflets across the atrial surfaces are constructed for each leaflet, in each long-axis cross-section.

Figure 4:
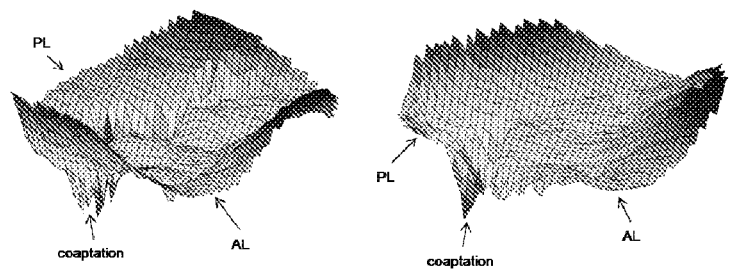
FIG. 4 illustrates two views of a manually segmented mitral valve, one of the atrial side and one of the ventricular side, where the surface rendering on the left shows the valve from an atrial perspective, and the surface rendering on the right shows the valve from a ventricular perspective.

For manual segmentation, the 3DE image volume was exported to an Echo-View 5.4 (Tomtec Imaging Systems, Munich, Germany) software workstation for image analysis. Image Analysis Echo-View allows for interactive manipulation including rotation, translation, surface rendering, and measurement of a fully three-dimensional echocardiographic dataset. First, the plane of the mitral valve orifice was rotated into a short-axis view. The geometric center was translated to the intersection of two long-axis planes which corresponded to the intercommissural and septolateral axes of the mitral valve orifice. A rotational template consisting of 18 long-axis cross-sectional planes separated by 10° increments was then superimposed on the 3DE image volume (FIG. 3(A)). Second, the two annular points intersecting each of the 18 long-axis rotational planes were identified and interactively marked by means of orthogonal visualization of each plane. Third, measurement planes were marked at fixed 1-mm intervals along the entire length of the intercommissural axis (FIG. 3(B)). Free-hand curves, each consisting of between 5 and 15 data points, connecting the juxtaposed anterior and posterior annulus across the atrial surfaces of the leaflets were constructed for each leaflet in each long-axis cross-section, resulting in an 800-point dataset for the valve. Two views of the manually segmented mitral valve, one of the atrial side and one of the ventricular side, are presented in FIG. 4. In FIG. 4, the surface rendering on the left shows the valve from an atrial perspective, and the surface rendering on the right shows the valve from a ventricular perspective. The posterior leaflet (PL), anterior leaflet (AL), and area of leaflet coaptation are indicated. The shading in this figure indicates the relative depth of points on the valve surface. It is noted that the regurgitant orifice area visible in the 3DE image volume was not segmented in this example. The total time for an experienced expert to perform this manual segmentation was over 4 hours.

Semi-Automated Segmentation

Figure 5:
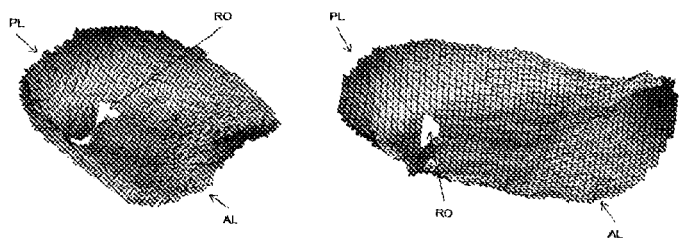
FIG. 5 illustrates the results of semi-automated mitral valve segmentation, where the surface rendering on the left is shown from an atrial perspective, and the surface rendering on the right is shown from a ventricular perspective.

For semi-automated segmentation of the same mitral valve, the 3DE image volume was imported into MATLAB (Mathworks, Inc.) and initialized using a custom user-interactive program. First, the user identified the location of the mitral valve in two maximum intensity projections of the pyramidal image volume. The first projection was a long-axis view, in which the user selected two points identifying the location of the mitral valve along the axial dimension. The second projection was a short-axis view, in which the user roughly traced the valve orifice. A masked image was automatically generated, in which the image intensity outside of the initialization boundaries was set to zero. Second, the masked image volume was exported from MATLAB to ITK-SNAP, an interactive segmentation toolkit, to perform a three-dimensional level sets segmentation based on intensity regions. The image was first preprocessed by thresholding and Gaussian smoothing, and then two spherical seeds were initialized on the preprocessed image, one on each leaflet. Next, the level sets algorithm was allowed to propagate for 400 iterations at a step size of 1 until the entire valve was segmented. Third, the binary image volume of the segmented valve was exported from ITK-SNAP to MATLAB where an approximate medial surface, including the annulus and leaflets, was extracted. FIG. 5 illustrates the results of semi-automated mitral valve segmentation. The surface rendering on the left is shown from an atrial perspective, and the surface rendering on the right is shown from a ventricular perspective. The posterior leaflet (PL), anterior leaflet (AL), and regurgitant orifice (RO) are labeled. The annulus was identified as the rim of the medial surface.

Figure 6:
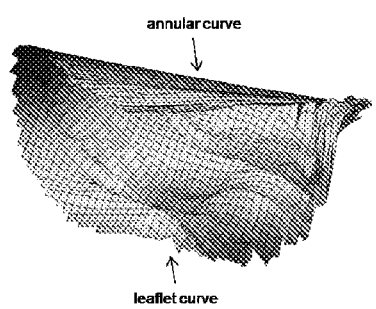
FIG. 6 illustrates application of a semi-automated segmentation technique to each image volume in the dataset of a mitral valve at nine time points in the cardiac cycle.

On a 3 GHz quad-core machine with 4 GB RAM, this entire semi-automated processing algorithm, including user-initialization, took less than three minutes. The segmentation identified 2800 points on the mitral valve, and the regurgitant orifice area was automatically delineated. In contrast, manual segmentation required 4 hours for identification of 800 points on the valve and did not automatically delineate the regurgitant orifice area. Moreover, the semi-automated segmentation technique was applied to each image volume in the dataset and efficiently segmented the valve at each time point in the cardiac cycle as shown in FIG. 6. FIG. 6 illustrates segmentations of the mitral valve shown at nine time points in the cardiac cycle. The shadings indicate the relative depth of points on the valve surface. Subtle differences in the renderings presented in FIGS. 4 and 5 may be the result of the difference in segmentation spatial resolution of the two approaches. In addition, the atrial surface was delineated in the manual approach, whereas an approximate medial surface was extracted with the semi-automated approach.

Mitral Valve Tenting Index

Figure 7:
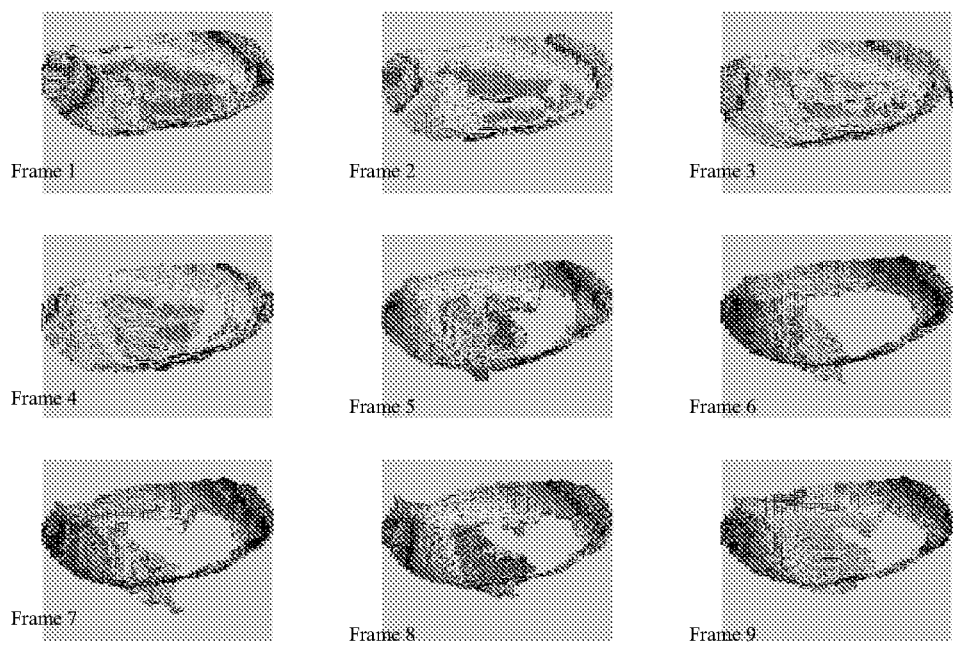
FIG. 7 illustrates the computation of the mitral valve tenting index as the volume enclosed by a surface fitted through the annular curve and a surface fitted through the leaflets, divided by the area of the valve orifice.

To demonstrate how valve segmentations can be used for clinically relevant morphometry, a custom MATLAB program was used for computation of the mitral valve tenting index using the results of the manual and semi-automated segmentations. This analysis involved several processing steps. First, a least-squares plane was fitted through the annular curve. A transform was subsequently applied to all points of the valve segmentation such that the geometric center of the annular orifice was located at the origin of the Cartesian coordinate system and the least-squares plane was aligned in the x,y plane (z=0). This transformation was applied to ensure that the computation of tenting index was independent of orientation. Second, continuous cubic piecewise functions were fitted to the annular curve and leaflet surface as shown in FIG. 7. The mitral valve tenting index was computed as the volume enclosed by these surfaces divided by the area of the valve orifice. The resulting mitral valve tenting index was 2.05 for manual segmentation and 1.94 for semi-automated segmentation. Previous studies of human subjects with IMR indicate that these values are consistent with mild leaflet tethering.

The preliminary results suggest that, compared to manual valve segmentation, semi-automated segmentation with minimal user interaction can produce accurate measurement of clinically relevant parameters like mitral valve tenting index. This will be validated against manual image analysis and sonomicrometric array localization. The inventors believe that the incorporation of 4D shape priors for the mitral valve based on medial representation, described below in connection with the Image Processing Algorithm, will ensure the consistency of morphometric analysis in both human and ovine subjects.

Image Processing Algorithm

Figure 8:
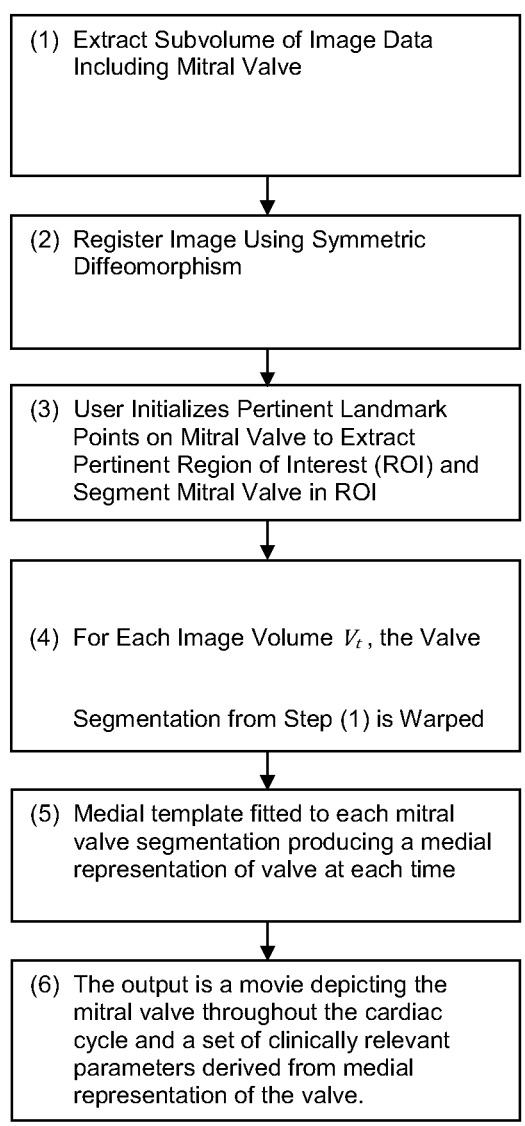
FIG. 8 outlines the image processing pipeline for generating medial representations of the mitral valve from rt-3DE datasets in accordance with the invention.

FIG. 8 outlines the image processing pipeline for generating medial representations of the mitral valve from rt-3DE datasets in accordance with the invention. Prior to processing rt-3DE image data with this pipeline, the inventors propose to: 1) build a 3D medial template for initialization, and 2) create a 4D shape prior to help guide the fitting of the template to new instances of the mitral valve. The shape prior and medial template need only be generated once; thereafter, this information can be used to generate medial representations of the mitral valve in any new rt-3DE dataset. The following sections describe template building, creation of the 4D shape prior, and details of the image processing pipeline outlined in FIG. 8.

Template Building for Initialization

As described above, the medial model for the mitral valve is defined by fitting a deformable medial template to a binary segmentation of the valve. In order to generate this medial template, a template construction technique similar to that employed in other 3D medial modeling applications is used.

First, 40 to 50 pre-existing rt-3DE datasets of the human mitral valve are collected, including a combination of subjects with and without valve pathology. The valve is segmented at each time point in each dataset, and the sequences of valve segmentations are referred to as training data. The valve segmentations are efficiently generated and manually adjusted using ITK-SNAP, an open-source software package for user-interactive level sets segmentation. The segmentation approach will be the same as that described above.

Second, a volumetric template is generated from these segmentations using an iterative unbiased averaging algorithm.

Third, a pruned Voronoi Skeleton of the binarized volumetric template is obtained. The Voronoi Skeleton is obtained using qhull (www.qhull.org) and simple heuristics are used to prune away the least salient branches of the skeleton. The skeleton will also be flattened under constraints that minimize local distortion. This flattening will be achieved with the Maximum Variance Unfolding technique, which finds a two-dimensional embedding of the skeleton's vertices that minimally distorts the distances between neighboring vertices.

Fourth, a manifold is fitted to the pruned skeleton by fitting low-degree polynomial surfaces to the data. A Delaunay triangulation of the template is acquired by controlled sampling of this surface. The resulting template appears similar to the mitral valve segmentation depicted in FIG. 5.

Since 3D medial modeling is used for characterization of both human and ovine subjects, the same procedure for human valve template construction is performed using pre-existing image data of the ovine mitral valve. The result is an initialization template of the ovine valve.

Creation of a 4D Shape Prior

With the training data used for template construction, a 4D shape prior (3D+time) for the mitral valve is created based on the medial representation. This shape prior will indicate how mitral valve 3D geometry changes over time and will help guide the fitting of the medial template to new instances of the mitral valve in rt-3DE datasets.

To create this shape prior, the medial template is deformed to the sequence of binary valve segmentations in each training dataset. The deformation process is framed as an optimization problem based on a Bayesian framework, wherein the volumetric overlap between the medial model and binary segmentation is maximized and the penalty terms required for inverse skeletonization are minimized. By deforming the medial template to match all segmentations in the training data, a probability distribution on the values of the model coefficients $\{m_i, R_i\}$ is acquired at each time point in the cardiac cycle. Principal component analysis can then be used to obtain eigenmodes that describe the spatio-temporal variation in the medial model. A shape prior is subsequently formulated that can be incorporated in the Bayesian objective function and used to guide template deformation in new rt-3DE datasets.

Image Processing Pipeline

Once obtaining the 4D shape prior and medial template, the following image processing steps outlined in FIG. 8 can be used to acquire clinically relevant information about mitral valve dynamics from new rt-3DE datasets. Generally speaking, the rt-3De images are first registered to obtain information about how the mitral valve deforms over time. Second, the mitral valve is segmented at each time point in the cardiac cycle with minimal user interaction. Third, the information about mitral valve structure is reduced into a medial model, a compact representation of shape. In other words, a volumetric segmentation of the valve is condensed to a form that is amenable to clinically relevant morphometry. FIG. 8 outlines the image processing pipeline, and the sections below provide an explanation of each step:

Step 1: The input to the algorithm is a series of N rt-3DE post-scan-converted images with echo envelope signals in Cartesian coordinates. Each dataset consists of a series of image volumes $1_t\{t=1, 2, \ldots, N\}$ acquired from one subject throughout the cardiac cycle. The user identifies a subvolume of the image data in which the mitral valve is located. This region of interest is extracted from each image volume in the dataset, and the valve is initially segmented at a single time point. The purpose of subvolume extraction is to reduce the input data for image registration and to identify boundaries for automated valve segmentation.

Step 2: Each pair of consecutive subvolumes, $V_t$ and $V_{t+1}$, is registered using the Advanced Normalization Tools (ANTS) framework for symmetric diffeomorphism which provides open-source functionality for deformable normalization. The goal of image registration is to estimate the displacement between an image volume $V_t$ acquired at time t and an image $V_{t+1}$ acquired at time t+1. In an exemplary embodiment, an extension of the Lagrangian diffeomorphic registration technique developed by Avants et al. and noted above is used to register rt-3DE images of the mitral valve.

Step 3: The user initializes pertinent landmark points on the mitral valve to extract a pertinent region of interest (ROI) (valve location) in the first image volume $V_1$ and then segments the mitral valve in this ROI using a level sets or comparable segmentation method.

Step 4: For each image volume $V_t$ in the time series $\{t=2, 3, \ldots, N\}$, the valve segmentation from Step 1 is warped using the deformation fields acquired by image registration to obtain segmentations of the valve at each of the remaining time points. The use of the deformation fields saved in Step 2 enables automated initialization of the valve segmentation in each image volume.

Step 5: The medial template described above in connection with Template Building for Initialization is deformed to match the binary valve segmentation at each time point. Similar to the matching process described above in Creation of a 4D Shape Prior, the medial model coefficients $\{m_i, R_i\}$ are deformed to minimize a Bayesian objective function. This objective function includes the following components: the volumetric overlap error between the medial model and binary segmentation; penalty terms for the inequality and equality constraints required by inverse skeletonization; regularization terms that control the quality of the medial mesh and enforce correspondence of the medial surfaces; and probabilistic terms based on the 4D shape prior that help guide fitting of the medial model. The result of this step is medial representations of the valve at each time point.

Step 6: Once a series of medial representations of the mitral valve are obtained from an rt-3DE dataset, many clinically relevant parameters of 3D mitral valve geometry and function can be extracted. One such example is presented above. The output of the algorithm includes a movie of the mitral valve throughout the cardiac cycle, maps of leaflet curvature at each time point, and a list of clinically relevant parameters. These parameters include, but are not limited to, the following: tenting volume and tenting index at mid-systole, regurgitant orifice area, annular area, and annular and leaflet displacement and velocity over time. Brief descriptions of each parameter are listed below:

Leaflet curvature (surrogate measure of valvular stress): derived from regional Gaussian curvature of the medial manifold;

Tenting volume (measure of valve remodeling): volume enclosed by continuous piecewise surfaces fitted through the valve leaflets and annular curve;

Tenting index (measure of subvalvular remodeling): tenting volume divided by the annular area;

Annular area (measure of annular dilatation): area of a continuous piecewise surface fitted through the annular curve; and Annular and leaflet displacement and velocity (assessment of valve function): displacement and velocity of control points on the medial representation of the valve throughout the cardiac cycle.

Alternative Approaches

Several alternative strategies to this image processing pipeline can be explored. For example, in the event that the image registration is inadequate even with the incorporation of an appropriate ultrasound noise model, the user can initialize the valve segmentation at each time point (Step 4), instead of the initialization points being warped by the deformation fields obtained from image registration in Step 2. In this case, motion tracking will still be achieved since the medial model establishes points of correspondence on the valve at each time point. As an alternative to Steps 3 through 5, the 4D medial template of the valve can be fitted directly to the ultrasound image data, rather than a binary segmentation of the valve. In this case, deformable modeling can be used for both shape representation and segmentation, which places less emphasis on the level sets segmentation algorithm and symmetric diffeomorphic image registration. The information contained in the 4D shape prior can be used to obtain a 4D segmentation, which would consist of simultaneous segmentation of the mitral valve at each predetermined time point in the cardiac cycle.

The techniques described herein also may be applied to the left ventricle to provide automated maps of surface curvature, wall thickness, and measurement of clinically relevant parameters such as those listed above. The techniques described herein also may be used to design and assess surgical repair techniques such as annuloplasty and ventricular restraint as well as to study postinfarction remodeling.

Those skilled in the art also will readily appreciate that many additional modifications are possible in the exemplary embodiment without materially departing from the novel teachings and advantages of the invention. For example, the embodiments above contemplate that the techniques applied to rt-3DE images are equally applicable to images acquired using other 3D imaging technologies. Also, those skilled in the art will appreciate that the methods described herein may be used for the design and development of mitral valve annuloplasty rings and models of same, as a research tool for the comparison of the efficacy of various annuloplasty ring designs in animal models, design and development of computer based virtual surgery techniques for the planning and training for surgical procedures, and as a tool for improved and earlier diagnosis of mitral valve disease. Accordingly, any such modifications are intended to be included within the scope of this invention as defined by the following exemplary claims.

The invention claimed is:

1. A processor-implemented method of quantifying dynamic movement of a mitral valve using 3 dimensional images of a mitral valve, comprising:
a processor obtaining a series of N 3-dimensional images of the mitral valve over time;
the processor registering each pair of consecutive 3-dimensional images using symmetric diffeomorphism to obtain information about how the mitral valve deforms over time;
segmenting the mitral valve in the N 3-dimensional images using landmark points on the mitral valve in the N 3-dimensional images at predetermined time points in the cardiac cycle;
the processor using the information about how the mitral valve deforms over time to fit a 3 dimensional medial model to the segmented mitral valve at each of the predetermined time points in the cardiac cycle; and
outputting the medial representations of the mitral valve as a quantification of said dynamic movement of said mitral valve over time.

2. The method of claim 1, wherein segmenting the mitral valve comprises initializing a region of interest in the N 3-dimensional images containing the mitral valve and then segmenting the mitral valve from the region of interest.

3. The method of claim 2, wherein segmenting the mitral valve further comprises warping segmented mitral leaflets with deformation fields obtained in said registering step at a time point in the cardiac cycle to initialize the mitral valve segmentation at other time points in the cardiac cycle and then segmenting the initialized mitral valve.

4. The method of claim 1, further comprising the processor building a 3D medial template for initialization and the processor creating a 4D shape prior of the mitral valve to guide 3D medial template fitting to either mitral valve segmentations created in said segmenting step or directly to the 3 dimensional images so as to produce a medial representation of the mitral valve at each predetermined time point in the cardiac cycle.

5. The method of claim 4, further comprising the processor creating a moving video image depicting the mitral valve throughout the cardiac cycle from said medial representations of the mitral valve and outputting said moving video image and a set of clinically relevant parameters derived from the medial representation of the mitral valve at each said predetermined time point in the cardiac cycle in said outputting step.

6. The method of claim 5, wherein the clinically relevant parameters comprise at least one of tenting volume of mitral leaflets of the mitral valve, tenting index of the mitral leaflets of the mitral valve at mid-systole, regurgitant orifice area of the mitral valve, annular area of the mitral valve, and annular and leaflet displacement and velocity over time.

7. The method of claim 1, wherein the 3-dimensional images are rt-3DE images.

8. The method of claim 1, wherein the information about how the mitral valve deforms over time is represented as a 4D prior for the mitral valve based on the 3-dimensional medial model.

9. A computer system for quantifying dynamic movement of a mitral valve using 3 dimensional images of a mitral valve, comprising:
means for providing a series of N 3-dimensional images of the mitral valve over time;
means for registering each pair of consecutive 3-dimensional images using symmetric diffeomorphism to obtain information about how the mitral valve deforms over time;
means for enabling segmentation of the mitral valve in the N 3-dimensional images using landmark points on the mitral valve in the N 3-dimensional images at predetermined time points in the cardiac cycle;
means for using the information about how the mitral valve deforms over time to fit a 3 dimensional medial model to the segmented mitral valve at each of the predetermined time points in the cardiac cycle; and
means for outputting the medial representations of the mitral valve as a quantification of said dynamic movement of said mitral valve over time.

10. The computer system of claim 9, wherein the means for enabling segmentation comprises means for initializing a region of interest in the N 3-dimensional images containing the mitral valve and then segmenting the mitral valve from the region of interest.

11. The computer system of claim 10, wherein the means for enabling segmentation further comprises means for warping segmented mitral leaflets with deformation fields obtained by said registering means at a time point in the cardiac cycle to initialize the mitral valve segmentation at other time points in the cardiac cycle and means for segmenting the initialized mitral valve.

12. The computer system of claim 9, further comprising means for building a 3D medial template for initialization and means for creating a 4D shape prior of the mitral valve to guide 3D medial template fitting to either mitral valve segmentations created by said means for enabling segmentation or directly to the 3 dimensional images so as to produce a medial representation of the mitral valve at each predetermined time point in the cardiac cycle.

13. The computer system of claim 12, further comprising means for creating a moving video image depicting the mitral valve throughout the cardiac cycle from said medial representations of the mitral valve and said outputting means outputs said moving video image and a set of clinically relevant parameters derived from the medial representation of the mitral valve at each said predetermined time point in the cardiac cycle.

14. The computer system of claim 13, wherein the clinically relevant parameters comprise at least one of tenting volume of mitral leaflets of the mitral valve, tenting index of the mitral leaflets of the mitral valve at mid-systole, regurgitant orifice area of the mitral valve, annular area of the mitral valve, and annular and leaflet displacement and velocity over time.

15. The computer system of claim 9, wherein the means for providing 3-dimensional images provides rt-3DE images.

16. The computer system of claim 9, wherein the information about how the mitral valve deforms over time is represented by the registering means as a 4D prior for the mitral valve based on the 3-dimensional medial model.

17. The method of claim 1, wherein the 3D medial model is defined by fitting a deformable medial template to a binary segmentation of the mitral valve.

18. The computer system of claim 9, wherein the 3 dimensional medial model is defined by fitting a deformable medial template to a binary segmentation of the mitral valve.

* * * * *

UNITED STATES PATENT AND TRADEMARK OFFICE
CERTIFICATE OF CORRECTION

Page 1 of 1

PATENT NO. : 9,129,392 B2
APPLICATION NO. : 13/580833
DATED : September 8, 2015
INVENTOR(S) : Robert C. Gorman et al.

It is certified that error appears in the above-identified patent and that said Letters Patent is hereby corrected as shown below:

Specification

Column 1,
Lines 16-22, delete "The present invention was supported by the National Institutes of Health under Grant Numbers NIH R0-1 HL-073021 (J. H. Gorman) and NIH R0-1 HL-063954 (R. C. Gorman), and NIH R0-1 HL-076560 (J. H. Gorman) and by the American Heart Association Established Investigator Award 0840121 N (J. H. Gorman). The government may have certain rights in the invention." and insert -- This invention was made with government support under grant numbers R01 HL063954, R01 HL073021, and R01 HL076560 awarded by National Institute of Health and by the American Heart Association Established Investigator Award 0840232. The government has certain rights in the invention. --.

Signed and Sealed this
Thirty-first Day of May, 2016

Michelle K. Lee
*Director of the United States Patent and Trademark Office*